(12) United States Patent
Burdgick et al.

(10) Patent No.: US 7,942,639 B2
(45) Date of Patent: May 17, 2011

(54) HYBRID BUCKET DOVETAIL POCKET DESIGN FOR MECHANICAL RETAINMENT

(75) Inventors: Steven Burdgick, Schenectady, NY (US); Adegboyega Makinde, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 11/395,813

(22) Filed: Mar. 31, 2006

(65) Prior Publication Data

US 2007/0231152 A1   Oct. 4, 2007

(51) Int. Cl.
*B63H 1/26* (2006.01)

(52) U.S. Cl. .................... 416/231 R; 416/233

(58) Field of Classification Search .......... 416/232, 416/227 R, 231 R, 231 B, 233
See application file for complete search history.

(56) References Cited

U.S. PATENT DOCUMENTS

| | | | |
|---|---|---|---|
| 4,175,912 A | | 11/1979 | Crane et al. |
| 4,384,607 A | | 5/1983 | Wood et al. |
| 5,429,877 A | | 7/1995 | Eylon |
| 5,580,217 A | | 12/1996 | Richards et al. |
| 5,634,771 A | * | 6/1997 | Howard et al. ........... 416/241 A |
| 5,655,883 A | | 8/1997 | Schilling |
| 5,720,597 A | | 2/1998 | Wang et al. |
| 5,735,044 A | | 4/1998 | Ferrigno et al. |
| 5,755,558 A | * | 5/1998 | Reinfelder et al. ........... 416/230 |
| 5,839,882 A | | 11/1998 | Finn et al. |
| 5,846,057 A | | 12/1998 | Ferrigno et al. |
| 5,931,641 A | | 8/1999 | Finn et al. |
| 6,033,186 A | | 3/2000 | Schilling et al. |
| 6,039,542 A | * | 3/2000 | Schilling et al. .............. 416/233 |
| 6,042,338 A | | 3/2000 | Brafford et al. |
| 6,139,278 A | | 10/2000 | Mowbray et al. |
| 6,139,728 A | | 10/2000 | Huber |
| 6,197,424 B1 | | 3/2001 | Morrison et al. |
| 6,241,471 B1 | | 6/2001 | Herron |
| 6,287,080 B1 | | 9/2001 | Evans et al. |
| 6,312,224 B1 | | 11/2001 | Knott et al. |
| 6,321,449 B2 | | 11/2001 | Zhao et al. |
| 6,364,616 B1 | | 4/2002 | Stevenson et al. |
| 6,454,536 B1 | * | 9/2002 | Evans et al. .............. 416/229 A |
| 6,607,358 B2 | | 8/2003 | Finn et al. |
| 6,811,898 B2 | | 11/2004 | Ohara et al. |
| 6,814,543 B2 | | 11/2004 | Barb et al. |
| 7,104,760 B2 | | 9/2006 | Burdgick |

FOREIGN PATENT DOCUMENTS

| | | |
|---|---|---|
| EP | 0 764 764 A1 | 3/1997 |
| EP | 0764764 A1 | 3/1997 |
| EP | 0 926 312 A2 | 6/1999 |
| EP | 0926312 A2 | 6/1999 |
| EP | 1 593 811 A2 | 11/2005 |
| EP | 1593811 A2 | 11/2005 |

OTHER PUBLICATIONS

EP Search Report, Application No. EP 07 10 4497 (Apr. 3, 2008).
European Search Report and Opinion, European Patent Office, Reference 193455/12285, Appln. No. 07104497.8-2315, Date of Completion of Search Apr. 3, 2008, 12 pgs.

* cited by examiner

*Primary Examiner* — Edward Look
*Assistant Examiner* — Dwayne J White
(74) *Attorney, Agent, or Firm* — Armstrong Teasdale LLP

(57) ABSTRACT

A method for mechanically attaching a composite or polymeric material to a bucket in a radial airfoil includes creating at least one dovetail shape pocket in the bucket having inclined interfaces with respect to the radial airfoil, and filling the pocket with the composite or polymeric material.

14 Claims, 6 Drawing Sheets

HYBRID BUCKET DOVETAIL POCKET DESIGN FOR MECHANICAL RETAINMENT

BACKGROUND OF THE INVENTION

This invention relates generally to steam turbines and more generally to methods and apparatus for retaining material in hybrid buckets.

Steam turbine buckets (blades) operate in an environment in which they are subject to high centrifugal loads. Additionally, they are in a steam environment with a varying angle of flow incidence to the bucket. A hybrid bucket is a steam turbine bucket that is made primarily of a metallic substance with at least one "pocket" of a non-metallic composite filler material. The filler material may further comprise a polyimide or other type of polymeric resin combined with continuous glass, carbon, KEVLAR® or other fiber reinforcement to achieve the original airfoil surface. This composite matrix is now being designed to be used in units that have high bucket temperatures during windage conditions (low flow, high speed "wind milling" of buckets). One issue with the very stiff high temperature composites is that the adhesion to the metal becomes one of the weakest links in the system.

U.S. Pat. No. 5,720,597, entitled "Multi-Component Blade for Gas Turbine," describes gas turbine aircraft blades constructed of metal and foam are provided with a composite skin, an erosion coating, or both. Configurations are disclosed that are applicable to fan blades, and more specifically to "propulsion engines." As such, the sizes and shapes of the pockets are significantly limited. Moreover, U.S. Pat. No. 6,139,728, entitled "Poly-Component Blade for a Steam Turbine," discloses configurations similar to those disclosed in U.S. Pat. No. 5,720,597, but for steam turbines. Benefits described include lower weight, which allows less robust blade alignment and thereby reduces cost. Furthermore, U.S. Pat. No. 6,042,338, entitled "Detuned Fan Blade Apparatus and Method," describes a "propulsion engine fan" and various types of blades with different pocket locations, but does not disclose blades of essentially one pocket with different rib structures. In addition, the disclosure is limited to pockets with radial location from a tip to 5%-38% span and chord wise from 15% to 35% from the leading edge and 20% to 45% from the trailing edge with similar limitations on the second or alternative pocket design.

BRIEF DESCRIPTION OF THE INVENTION

In one aspect, some configurations of the present invention provide a method for mechanically attaching a composite or polymeric material to a bucket in a radial airfoil. The method includes creating at least one dovetail shape pocket in the bucket having inclined interfaces with respect to the radial airfoil, and filling the pocket with the composite or polymeric material.

In another aspect, some configurations of the present invention provide an airfoil having a bucket that has forward and aft internal interfaces. The bucket has a plurality of inclined surfaces along forward and aft internal interfaces and a pocket filled with a filler material.

DETAILED DESCRIPTION OF THE INVENTION

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
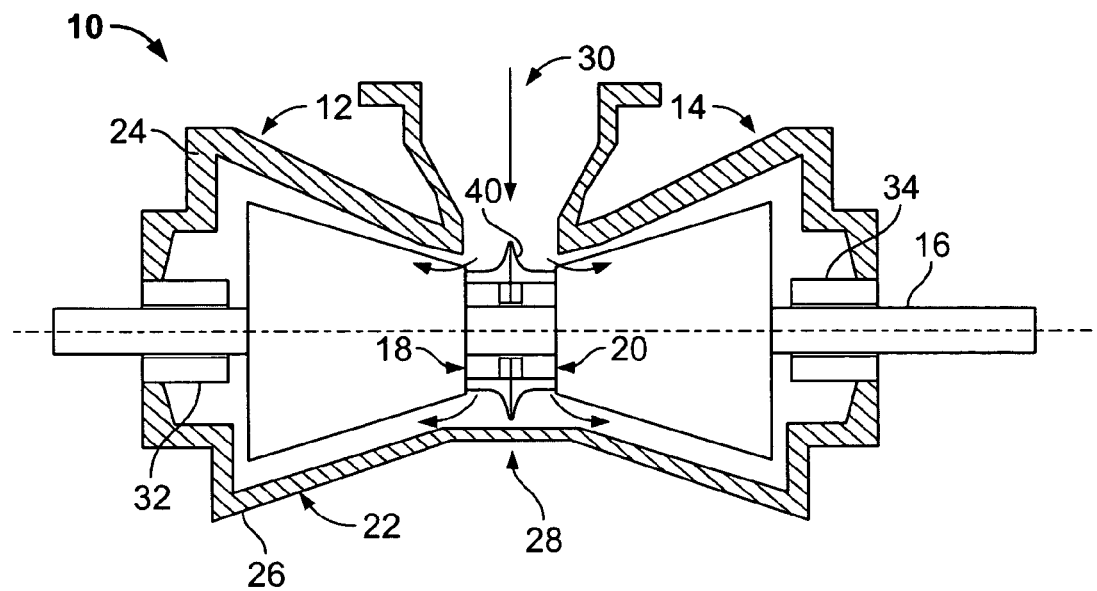
FIG. 1 is a cross-sectional schematic illustration of an exemplary opposed-flow steam turbine engine.

FIG. 1 is a schematic illustration of an exemplary opposed-flow, low-pressure (LP) steam turbine 10. Turbine 10 includes first and second low pressure sections 12 and 14. As is known in the art, each turbine section 12 and 14 includes a plurality of stages of diaphragms (not shown in FIG. 1). A rotor shaft 16 extends through sections 12 and 14. Each LP section 12 and 14 includes a nozzle 18 and 20. A single outer shell or casing 22 is divided along a horizontal plane and axially into upper and lower half sections 24 and 26, respectively, and spans both LP sections 12 and 14. A central section 28 of shell 22 includes a low pressure steam inlet 30. Within outer shell or casing 22, LP sections 12 and 14 are arranged in a single bearing span supported by journal bearings 32 and 34. A flow splitter 40 extends between first and second turbine sections 12 and 14.

Figure 2:
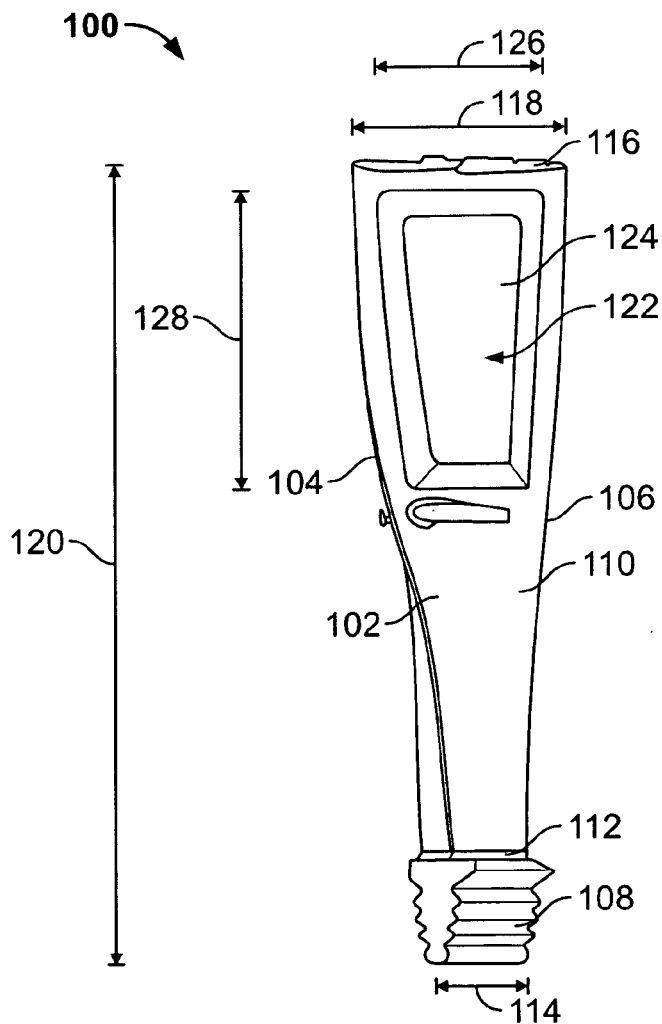
FIG. 2 is a perspective view of an exemplary steam turbine bucket that may be used with the steam turbine shown in FIG. 1.
Figure 3:
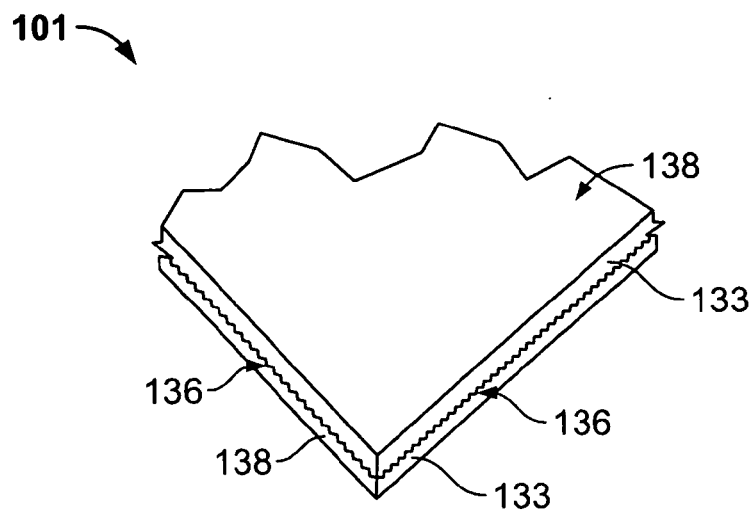
FIG. 3 is a perspective view of a portion of a composite material used to fill a pocket formed in the turbine bucket shown in FIG. 2.

FIG. 2 is a perspective view of a steam turbine bucket 100 that may be used with turbine 10 (shown in FIG. 1). FIG. 3 is a perspective view of a portion of a composite material 101 used to fill a pocket 122 formed in turbine bucket 100. Turbine bucket 100 includes a pressure side 102 and a suction side (not shown in FIG. 2) connected together at a leading edge 104 and a trailing edge 106. Pressure side 102 is generally concave and the suction side is generally convex. Turbine bucket 100 includes a dovetail 108, an airfoil portion 110, and a root 112 extending therebetween. In the exemplary embodiment, airfoil portion 110 and root 112 are fabricated from one unitary piece and are coupled to dovetail 108. In an alternative embodiment, airfoil portion 110, root 112, and dovetail 108 may all be fabricated as a unitary component. In the exemplary embodiment, bucket 100 couples to rotor shaft 16 via dovetail 108 and extends radially outward from rotor shaft 16. In an alternative embodiment, bucket 100 may be coupled to rotor shaft 16 by other devices configured to couple a bucket to a rotor shaft, such as, a blisk.

Bucket dovetail 108 has a length 114 that facilitates securing bucket 100 to rotor shaft 16. As rotor shaft 16 may vary in size, length 114 may also vary to facilitate providing optimal performance of bucket 100 and, more specifically, turbine 10. Root 112 extends radially outward from dovetail 108 and has a length that is approximately equal to dovetail length 114. Airfoil portion 110 extends radially outward from root 112 and also has an initial length that is approximately equal to dovetail length 114. Notably, in the exemplary embodiment, root 112 and airfoil portion 110 are fabricated unitarily together such that there are no seams or inconsistencies in bucket 100 where root 112 transitions to airfoil portion 110.

Airfoil portion 110 extends radially outward from root 112 and increases in length to a tip 116 of bucket 100. In the exemplary embodiment, tip 116 has a length 118 that is longer than length 114. Airfoil portion 110 also has a width (not shown) sized to facilitate locking a snub cover (not shown). As such, tip length 118 and the tip width may vary depending on the application of bucket 100 and, more specifically, turbine 10. Bucket 100 has a radial length 120 measured from dovetail 108 to tip 116. Length 120 is selected to facilitate optimizing performance of bucket 100. As such, bucket length 120 may also vary depending on the application of bucket 100 and, more specifically, turbine 10.

In some configurations of the present invention, and referring to FIG. 2 and FIG. 3, a directional fiber 136 orientation is used in a hybrid bucket configuration. Bucket 100 can be fabricated of a metallic base metal and include a pocket or pockets 122 that can be filled with a polymer composite material 101.

Composite material 101 can be a polyimide based composite material or any other suitable material that enables bucket 100 to function as described herein. Composite material 101 includes fibers 136, such as, but not limited to, glass, carbon, Kevlar or other fibers, which are bonded together, for example, in a resin matrix 138. Fibers 136 may be contained in a single layer 133, in a plurality of layers 133, in one or more layers of fabric, or dispersed throughout matrix 138.

In the exemplary embodiment, bucket 100 also includes a pocket 122 defined within airfoil portion 110. Alternatively, airfoil portion 110 may include more than one pocket 122. Pocket 122 is formed with a bottom surface 124 that is recessed from pressure side 102 of airfoil portion 110. Alternatively, pocket 122 may be formed with a bottom surface 124 that is recessed from the suction side (not shown in FIG. 2). In the exemplary embodiment, pocket 122 is substantially rectangular and has a width 126 and a length 128. Alternatively, as is known in the art, pocket 122 may be formed with any cross-sectional shape that enables bucket 100 to function as described herein. Width 126 and length 128 are selected to ensure that pocket 122 is circumscribed by pressure side 102. In other embodiments, although pocket 122 may be shaped differently, in each configuration, pocket 122 is circumscribed by pressure side 102. The shape of pocket 122 is selected to facilitate optimizing performance of bucket 100.

In some configurations of the present invention, a method is provided for providing mechanical attachment of a composite or polymeric material 101 to a bucket 100 in a radial airfoil 102. This method advantageously assists in reducing shear stress in an adhesive layer between metal of bucket 100 and composite material 101 as well as to provide a positive mechanical lock of composite material 101 to bucket 100. Some configurations of the present invention use a composite material matrix 101 that comprises one or several different layers of fiber material 136 and/or fiber material 136 in different weave orientations. Also, some configurations of the present invention utilize a "dovetail" shaped pocket 190 in bucket 100 that has "dovetail" shaped forward and aft edges (i.e., interfaces) 168 that help to distribute composite material 101 load into metallic bucket 100 during centrifugal loading. Some configurations of the present invention can use either a soft (low temperature) composite material 101 matrix or a stiff (high temperature) composite material 101 matrix, in configurations in which the pocket has a backwall.

In other configurations of the present invention, a method for tuning a row of continuously coupled or freestanding turbine buckets 100 is provided that facilitates reducing the amplitude of vibration and/or damping characteristics. The method includes using a directional fiber orientation in a hybrid bucket 100 configuration. Bucket 100 can be made of a metallic base metal with a pocket or pockets 122 that can be filled with a polymer composite. Composite material 101 can be a polyimide based composite or another suitable material type, and the material 101 may include fibers, such as glass, carbon, Kevlar® or other fibers, which are bonded, for example, in a resin matrix. The fibers may be contained in a single layer, in a plurality of layers, in one or more layers of fabric, or throughout matrix 18. The orientation of fibers is selected to facilitate tuning bucket 100 in a particular fashion and/or may be used to "mixed tune" the set. In other words, the fiber orientation is determined in accordance with a preselected tuning of bucket 100. The frequency characteristic is controlled in some configurations of the present invention by tailoring the fiber orientation during composite lay up and cure. By fine tuning the fiber orientation and/or the weave of a fabric, some configurations of the present invention facilitate controlling strengths and elastic modulus in different directions in fabric constructed from these fibers.

Figure 4:
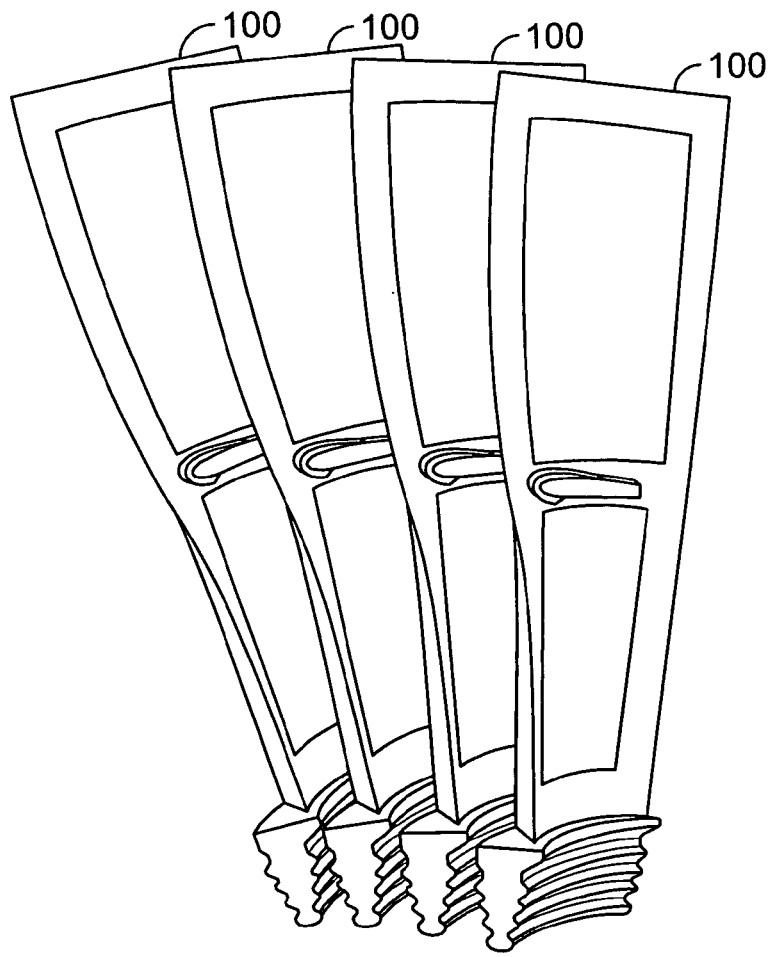
FIG. 4 is a perspective view of some of a plurality of groups of buckets that may, in some configurations, be used with the steam turbine shown in FIG. 1.
Figure 5:
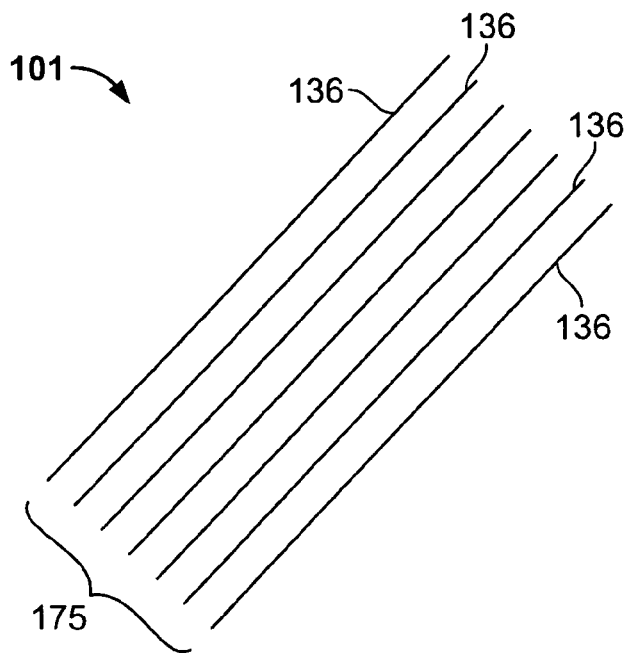
FIG. 5 is an enlarged view of an exemplary uniaxial fiber orientation.
Figure 6:
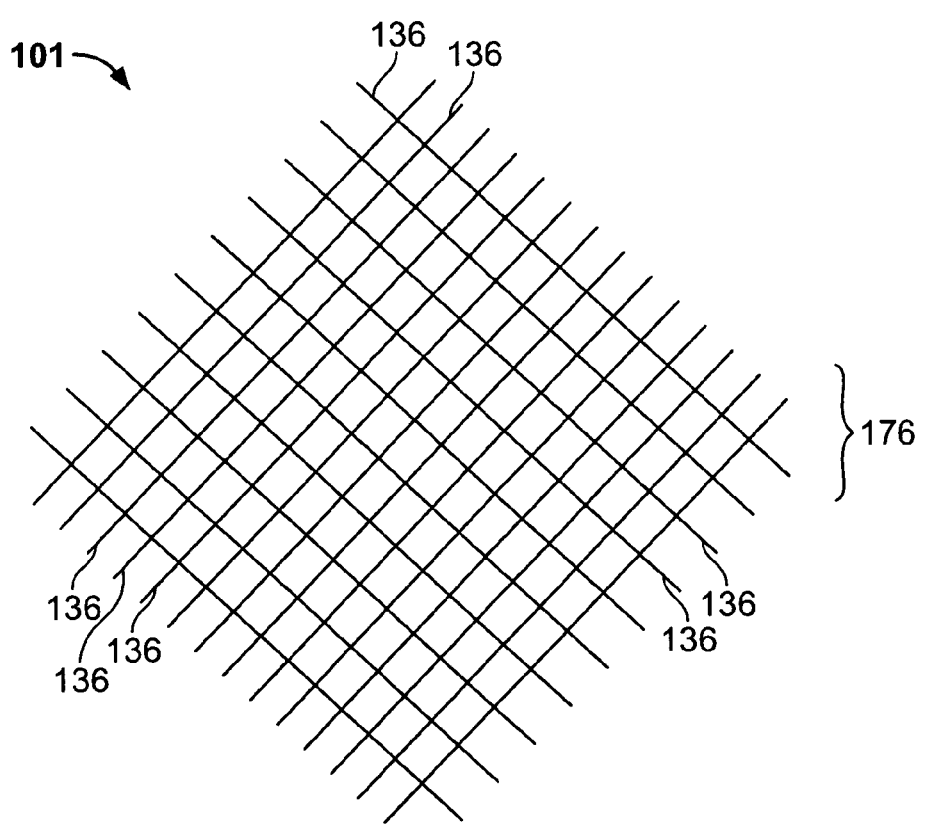
FIG. 6 is an enlarged view of an exemplary biaxial fiber orientation.
Figure 7:
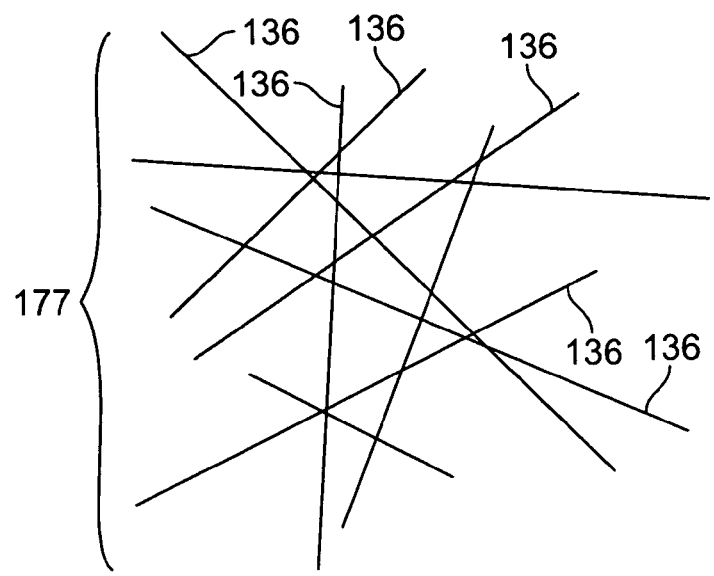
FIG. 7 is an enlarged view of an exemplary quasi-isotropic fiber orientation.

FIG. 4 is a perspective view of a plurality of buckets 100 that may, in some configurations, be used with steam turbine 10 (shown in FIG. 1). FIG. 5 is an enlarged view of an exemplary uniaxial fiber orientation. FIG. 6 is an enlarged view of an exemplary biaxial fiber orientation. FIG. 7 is an enlarged view of an exemplary quasi-isotropic fiber orientation.

It should be noted that configurations of the present invention can be used with other steam or gas turbine buckets or blades where permitted by the environment (e.g., gas turbine forward stage compressor blades).

Some configurations of the present invention provide a method for mechanically attaching composite or polymeric material 101 into a bucket 100 in a radial airfoil 102. To hold composite or polymeric material 101 in bucket 100 and referring to FIGS. 2, 8, and 9, a shallow pocket 122 is created in bucket 100 and filled with composite or polymeric material 101. Adhesion between metallic bucket 100 and composite or polymeric material 101 is thereby increased, and sheer stress at the adhesion layer is reduced using mechanical methods. Pocket or pockets 108 have a gradual incline up to an interface with a flowpath surface 168 of bucket 100. The embodiment illustrated in FIG. 8 has a convex interface 180, while the embodiment illustrated in FIG. 9 has a concave interface 182.

Figure 9:
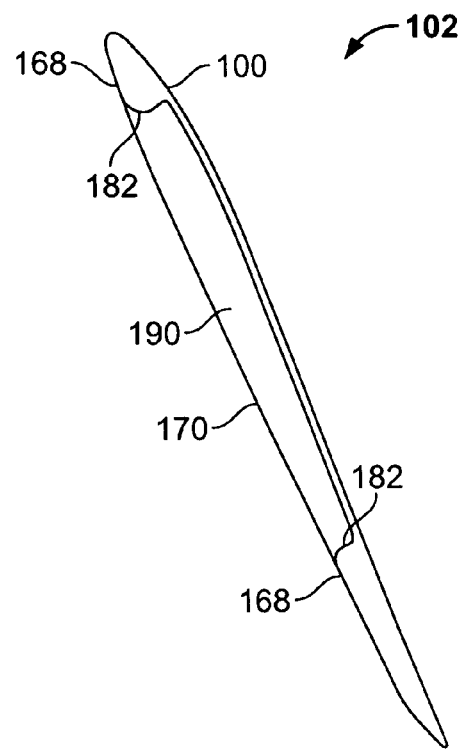
FIG. 9 is a plan view of a bucket having a shallow pocket with a thin back wall and a concave interface.
Figure 10:
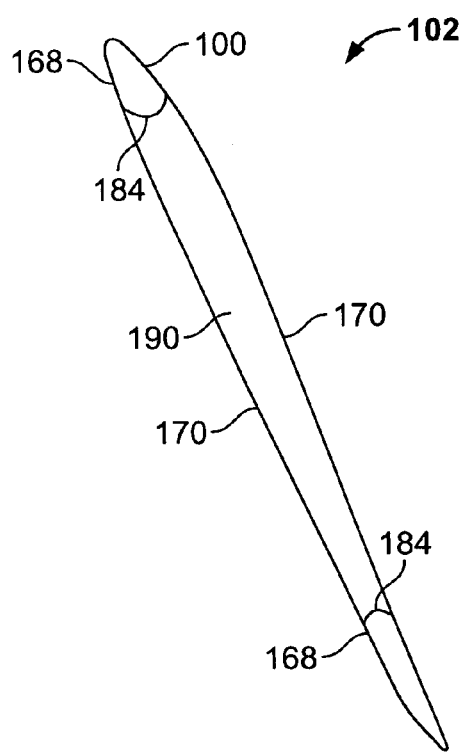
FIG. 10 is a plan view of a bucket having a full through window with a concave interface.
Figure 11:
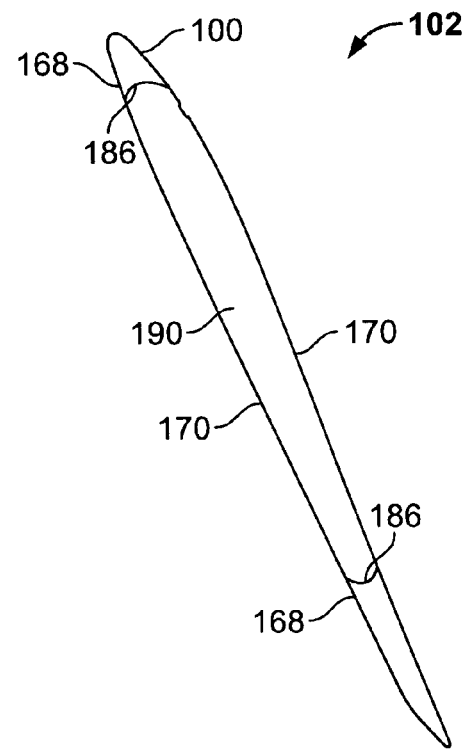
FIG. 11 is a plan view of a bucket having a full through window with a convex interface.

In some configurations of the present invention and referring to FIGS. 10, 11, 12, and 13, one or more dovetail-shaped hybrid buckets are provided. Inclined interfaces 184, 186 with respect to radial airfoil 102 help retain the composite or polymeric 101 material and help reduce adhesion shear stress between composite or polymeric material 101 and metallic bucket 100 for either through window 190 or shallow pocket configurations 122 (the latter shown in FIGS. 8 and 9). FIG. 10 is an illustration of a full through window 190 having a convex interface 184, while FIG. 11 is an illustration of a full through window with a concave interface 186. To produce through wall window 190, a high stiffness composite material 101 is used. Prior art configurations with hybrid buckets used a polymer that could tolerate only low temperatures and had little stiffness, so going through a bucket wall was not possible.

Figure 12:
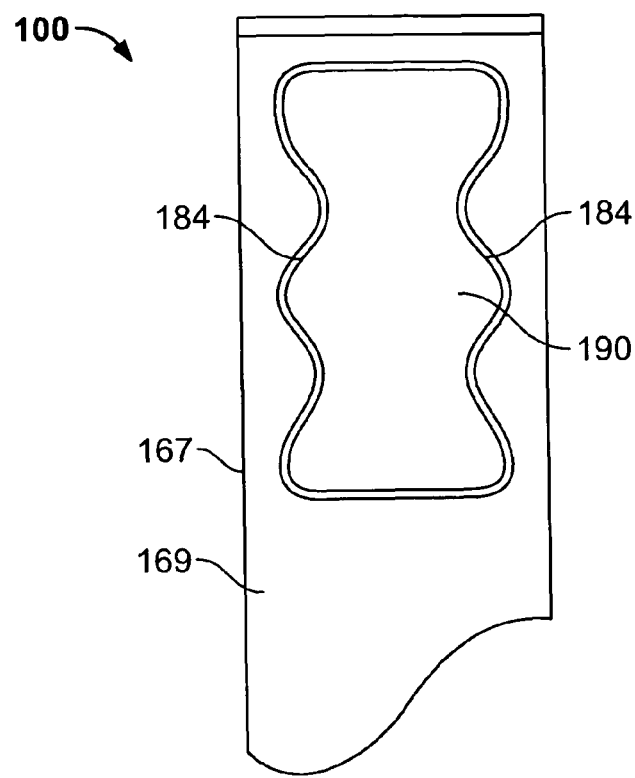
FIG. 12 is a side view of a portion of the bucket shown in FIG. 10.
Figure 13:
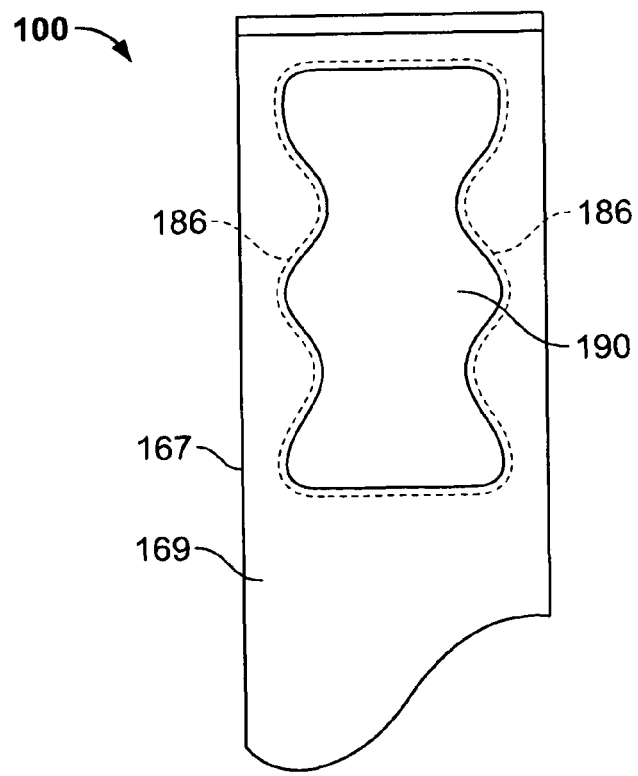
FIG. 13 is a side view of a portion of the bucket shown in FIG. 11. The dashed lines in FIG. 8 represent concave interfaces.

In some configurations of the present invention and referring to FIGS. 12 and 13 (in which dotted lines represent edges hidden from view and solid lines represent visible edges), a hybrid bucket 100 is provided that comprises a plurality of inclined surfaces 184, 186 along a forward and an aft bucket interface. In the configuration illustrated in FIG. 12, convex interfaces 184 are used, whereas in the configuration illustrated in FIG. 13, concave interfaces 186 are used. Convex interfaces 184 and concave interfaces 186 provide a radial compression feature to retain a composite or polymer filler (not shown in FIG. 12 or 13) in bucket 100. Such "dovetail" configurations can be used to replace prior art shallow "pocket" configurations or be used in conjunction with the prior art configuration. (The prior art pocket configuration is a shallow pocket that does not go through the airfoil. The pocket is filled with a filler material to achieve the original airfoil shape). The dovetail surface in some configurations is either concave or convex around the edge, as shown in FIGS. 12 and 13, respectively, in accordance with that which proves most beneficial during the composite lamination process and/or that which proves to have the best retainment characteristics. The determination is made empirically in some configurations.

Also in some configurations, through pocket window 190 is configured to minimize or at least reduce stress concentrations on a larger pocket or bucket. The dovetail interface can have any of a variety of geometric shapes in accordance with a finite element analysis of the bucket.

Figure 8:
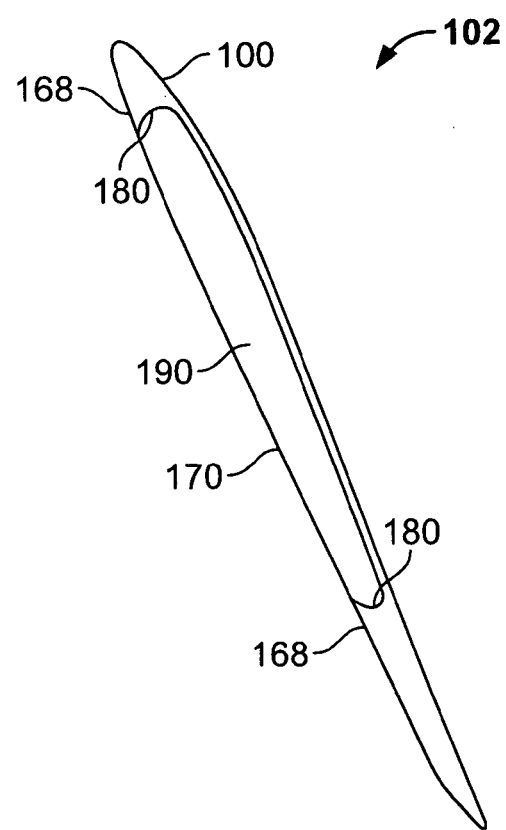
FIG. 8 is a plan view of a bucket having a shallow pocket with a thin back wall and a convex interface.

Composite or polymeric material 101 in some configurations comprises a fabric material 136 (by way of example without excluding others, glass, carbon, or KEVLAR®) situated in layers using a resin binder or filler. Referring to FIGS. 6, 7, and 8, This composite is made in some configurations using pre-impregnated unidirectional 175, quasi-isotropic 176, quasi-isotropic 177, or woven fabric tape lay-up, or in other configurations, resin is injected over the fibers during a casting process. In some of these configurations, the material base is a high temperature polyimide base, but configurations use different polymers with high temperature capabilities.

Referring to FIGS. 8, 9, 10, and 11, some configurations of the present invention provide "caul sheets" 170 on either or both sides of an airfoil 102 during a composite cure in a pocket 122 or 190. Caul sheet 170 is used to make the airfoil shape where a pocket 122 or 190 is machined away. In some configurations of the present invention, resin fillers are used to create an airfoil shape that existed prior to pocketing.

In addition to single-stage turbine configurations, multi-stage configurations are possible when the temperature is sufficiently low and buckets can be made sufficiently large.

Aside from single through wall dovetail configurations of the present invention, some configurations are used with a shallow pocket 122. In the latter case, a dovetail interface pocket can be smaller than a main pocket. The dovetail interface pocket also assists in reducing shear stress at a composite to metal adhesion layer.

While the invention has been described in terms of various specific embodiments, those skilled in the art will recognize that the invention can be practiced with modification within the spirit and scope of the claims.

What is claimed is:

1. A method for mechanically coupling at least one of a composite or a polymeric material to a radial airfoil, said method comprising:
   forming at least one window in an airfoil portion of the radial airfoil, such that the window extends through the airfoil, wherein the window includes a sidewall having an inclined surface that extends through the airfoil portion and that is oriented to facilitate retaining the at least one of a composite or a polymeric material therein;
   forming a dovetail-shaped surface of the sidewall that defines the at least one window, wherein the dovetail-shaped surface facilitates transferring a force imparted on the at least one of a composite or a polymeric material to the radial airfoil during a centrifugal loading of the radial airfoil, wherein the dovetail-shaped edges include at least one of the plurality of inclined surface sidewalls; and
   filling the window with the at least one of a composite or a polymeric material configured to tolerate relatively high temperatures generated on the airfoil by windage conditions and having a sufficient stiffness to facilitate adherence within the at least one window, wherein windage conditions comprises operation during low flow, relatively high speed rotation conditions.

2. A method in accordance with claim 1 wherein said forming at least one window comprises creating a plurality of windows within the airfoil portion.

3. A method in accordance with claim 1 wherein filling the window further comprises filling the window with a filler material to substantially return an original shape of the radial airfoil.

4. A method in accordance with claim 1 further comprising curing the composite or polymeric material utilizing a caul sheet on both sides of the radial airfoil.

5. A method in accordance with claim 1 further comprising orienting the fibers of the composite or polymeric material to facilitate tuning the radial airfoil.

6. A method in accordance with claim 1 further comprising forming the dovetail shaped surface of the sidewall with at least one of a concave edge and a convex edge such that the dovetail shaped surface of the sidewall facilitates retaining the at least one of a composite or a polymeric material within the window.

7. An airfoil comprising:
   a first side comprising an outer surface;
   a second side coupled to said first side, and comprising an outer surface;
   at least one window formed in an airfoil portion of the radial airfoil, such that the window extends through the airfoil and has a sidewall formed within said airfoil, said at least one window comprising a dovetailed-shaped surface of said sidewall of said airfoil, said dovetailed-shaped surface is inclined and extends obliquely inward from said first side towards said second side through said airfoil; and
   a filler material positioned within said at least one window, said sidewall having an inclined surface facilitates retaining said filler material within said at least one window.

8. An airfoil in accordance with claim 7 wherein said sidewall having an inclined surface is either concave or convex around said dovetail-shaped edges.

9. An airfoil in accordance with claim 8 wherein said sidewall having an inclined surface is selected to be either concave or convex around said dovetail-shaped edges in accordance with at least one of a plurality of retainment characteristics.

10. An airfoil in accordance with claim 7 wherein said sidewall having an inclined surface facilitates reducing stress concentrations induced on said airfoil.

11. An airfoil in accordance with claim 7 wherein said filler material comprises layers of a fabric material in a resin matrix.

12. An airfoil in accordance with claim 11 wherein said fabric material is a pre-impregnated unidirectional fabric tape lay-up.

13. An airfoil in accordance with claim 12 wherein said fabric material is a quasi-isotropic tape lay-up.

14. An airfoil in accordance with claim 12 wherein said fabric material is at least one of a uniaxial and a biaxial material.

* * * * *